April 29, 1969 H. GLOCK 3,441,918
MAGNETIC STORE EMPLOYING AT LEAST TWO INHIBIT CONDUCTORS PER STORAGE PLANE
Filed Sept. 29, 1965
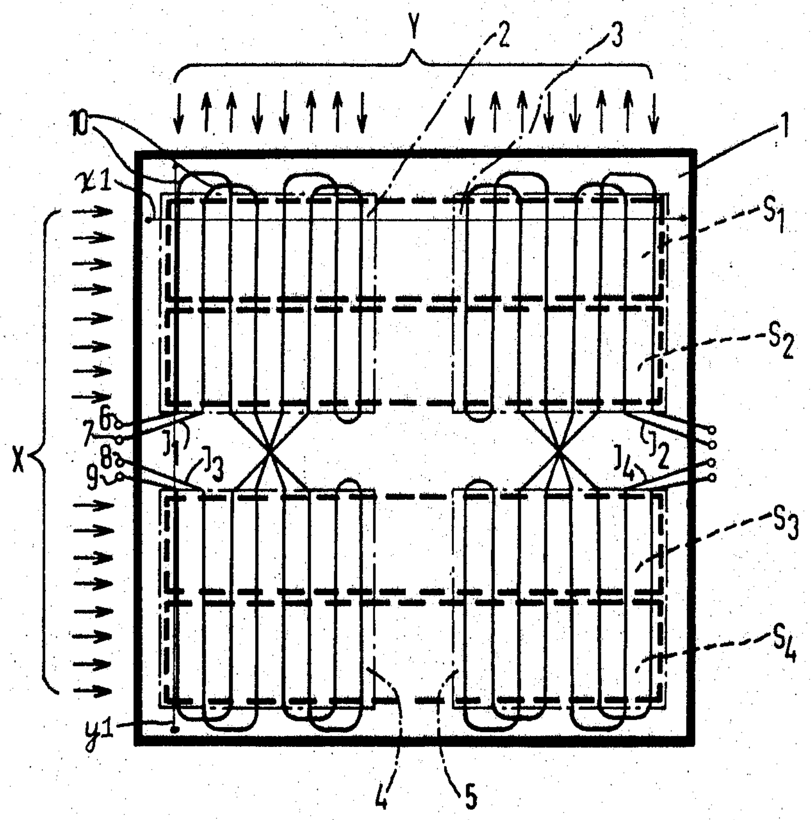
INVENTOR
Hans Glock
BY Stiel & Stiel
ATTYS.

United States Patent Office 3,441,918

Patented Apr. 29, 1969

3,441,918
MAGNETIC STORE EMPLOYING AT LEAST TWO INHIBIT CONDUCTORS PER STORAGE PLANE

Hans Glock, Germering, Germany, assignor to Siemens Aktiengesellschaft, a corporation of Germany Filed Sept. 29, 1965, Ser. No. 491,084
Claims priority, application Germany, Sept. 30, 1964, S 93,508
Int. Cl. G11b 5
U.S. Cl. 340—174 10 Claims

ABSTRACT OF THE DISCLOSURE

A magnetic store employs inhibit conductors which are transposed through the store so that they lie in lamellar relation to any other conductor for only a portion of their lengths.

The invention relates to a magnetic store operating according to the coincidence principle. Such a store consists generally of individual magnetic planes arranged spatially one behind the other, which are capable, under identical addresses, in each case to store an information unit of a word. This type of store is constructed, as a rule, as a magnetic core store; but theoretically, the thin magnetic layers which have recently been gaining in importance can also be used for such a storage area in connection with the principles of the present invention.

A large number of individual storage cells, for example, magnetic ring cores, are arranged in storage or matrix planes. These storage cells are arranged in rows and columns, and are magnetically connected with at least, in each case, a row conductor and a column conductor, and a control conductor which serves as the address selection, as well as an inhibit conductor, and also as a read conductor. The switching takes place in magnetic core stores by means of the fact that all of these conductors are connected through the aperture of each core only once. While the address selection takes place in each of the storage planes under the control of an $x$- and of a $y$-conductor, the information which is to be written into the selected storage cell of each plane is determined by the inhibit current flowing or not flowing over the inhibit conductor or conductors of the storage plane in question. As is well known, in the reading as in the writing of information into the storage arrangement under consideration, a current flows which has half the magnitude of that which is necessary for the "flipping" of a storage cell having an approximatetly rectangular hysteresis loop, that is, for its transition from one remanent state into the other, in the selected control conductors in $x$- and $y$-direction in each case.

Assume now that the storage cell before the beginning of the writing process is in the "zero" state, i.e., in the one remanent position, then the two "half-currents" flowing in the $x$- and the $y$-conductors cause the storage cells to flip into the "one" state, unless an oppositely directed inhibit current of equal magnitude with the one half-current which flows simultaneously therewith. The read-out of the information contained in selected storage cells takes place as a rule over separate conductors, namely, the read conductors, at least once each for each storage plane; or more precisely, for each information unit "bit" of a word. In the reading process two half-currents again flow in both control conductors, but in the writing process the current flows in the reverse direction. Thereby, all the control storage cells which are situated in the "one" state are caused to flip. This process induces in the read conductor a signal which is indicative of the fact that the corresponding storage cell has been in the "one" state. If the storage cell, however, was in the "zero" sttae before the read process, then no flipping occurs, and no corresponding signal is induced in the read conductor. In any case, however, all the storage cells are in the "zero" state after the read process.

This process just now set forth may, however, be expected only under ideal conditions, In practice, a number of interferences occur within the stores, which if are not compensated for would prevent efficient operation of the store. Thus, the conductors running closely parallel to one another cause interferences between one another, both inductively and also capacitively. Furthermore, in all conductors which are linked (in close proximity) with another conductor over one or more storage cells, interference signals are induced in the control conductors as a consequence of imperfectly rectangular hysteresis loop of the cores. The magnitude of the interference signals as well as their harmful effect increase in general more than linearly with the size of the store and inversely with the amount of the storage cycle time.

The object of the present invention is to remove interference signals transmitted to read conductors, or at least to render these signals ineffective.

According to the invention, the read conductors are oriented in such a manner that the number of interference signals coupled from a half-controlled core to each read conductor of one direction is substantially equal to that of another direction, thereby cancelling the interference signals.

Further, according to the invention, a lamellar conduction of the read conductors is provided, in which the main direction of the read conductors run perpendicularly to that of the inhibit conductors. It is thereby achieved that the read conductors interfere with the inhibit conductors and one group of control conductors such as the column conductors, to only a slight extent. The linking that causes this interference is present in the second group of control conductors, but this linking does not effect the operation of the store because the control pulses used in the reading operation are echeloned, that is, the control impulses are introduced in two coordinate directions as the read signal can occur only with the second control impulse (which is created through the flipping of a core).

The present invention, however, primarily remedies the problem of diminishing the interference signals coupled from the inhibit conductors to the control conductors. For even in the control conductors, interference signals may have disagreeable consequences. Thus, namely, the inhibit current, which flows in all storage planes in which "zero" is to be induced and which interference signals are capacitively coupled into the control conductor that runs parallel to the inhibit conductor in each storage plane, causes the control current in a given control conductor to be cancelled to such an extent that a given core into which a "one" is to be written does not change states (where no inhibit current is flowing).

In the past, it has been known to provide "rotation" of successively following storage planes in order to remedy the above-mentioned problem. By means of the rotation scheme, certain of the control conductors are located in all storage planes with the same orientation, but the inhibit conductors, alternating from storage plane to storage plane, are conducted once for each parallel row, and once for each parallel column. In this manner it is possible that one and the same control conductor is linked and interferes thereby with the inhibit conductors for only a half of its length. The rotating scheme for the storage planes generally renders the use of time-echeloned control currents for the reading process when necessary.

Still further according to the invention, an alternative solution to this problem is to achieve a smaller amount of interference between inhibit conductors and control conductors. The store, according to the invention, operating in acordance with the coincident current principle, composed of individual storage planes having magnetic storage cells (cores) arranged in rows and columns and connected in each case with a row conductor and a column conductor as well as with an inhibit conductor, each storage plane has at least two inhibit conductors that are linked (closely and physically related) to the row conductors or to the column conductors, being substantially parallel thereto, but are connected in such a way that they are linked within each storage plane with the same row conductors or column conductors for only a portion of their length.

The inhibit conductors in accordance with the principles of the present invention can take every known read conductor orientation, diagonal or parallel to the coordinate direction starting and ending at the same position, and lamellar form (adjacent conductors having oppositely-directed current flow). The lamellar orientation is especially advantageous for read conductors. Also, it is possible to use the principle of storage plane rotation which eliminates the necessity of using pulse-echeloning, which would theoretically eliminate the need for lamellar orientation of the read conductors.

Other objects, advantages and features will become more apparent with the teaching of the principles of the present invention in connection with the disclosure of the preferred embodiment thereof in the specification, claims and drawing, in which the drawing is a schematic representation of a magnetic store in accordance with the principles of the present invention.

As shown on the drawing:

The storage plane 1 is illustrated in the drawing is subdivided into four equal square fields 2–5, with a mutual distance apart which is greater than the column of row spacing. There is an even number of cores per row for each field. The cores themselves, a core being located at each crossing line of a row and column conductor, are for the sake of simplicity and clarity not shown.

In each case, two adjacent fields, 2, 3 and 4, 5 are traversed by common *x*-conductors and each of two vertical fields 2, 4 and 3, 5 by common *y*-conductors. The *x*- and *y*-conductors are generally common not only to fields of a matrix plane, but also to all storage planes ordinarily arranged in succession so that storage cells are controlled at corresponding points in each plane by switching on of a single *x–y* conductor pair in each storage plane simultaneously.

As a result, the amount of interference signals coupled from the inhibit conductors to each control conductor running parallel thereto is reduced by a factor which corresponds to the number of inhibit conductors running adjacently and parallel within a storage plane with the same control conductors by reducing the number of portions of conductors that interfere with each other, assuming that the inhibit conductors are parallel to the corresponding control conductors.

The read conductors form a lamellar, such as those represented in the drawing as S1, S2 and S3, S4, respectively, in which the read conductors are oriented essentially parallel to the long edge of the lamellar formed by the *x*-conductors. For the sake of clarity, the read conductors themselves are not shown, however, they are connected over two adjacent fields 2, 3 and 4, 5, respectively, of the storage plane. The read conductors are located in the example illustrated essentially next to one another in adjacent columns. According to the invention, however, the inhibit conductors do not run over the entire length of the *y*-conductor within a storage plane next to the same *y*-conductors, but are crossed in the gaps between the fields 2, 4 and 3, 5, respectively, of the storage plane 1 so that they traverse over columns other than those fields in which they begin and end. For example, the inhibit conductor J1 first traverses in meander pattern the left-hand half of field 2, continues then in the right half of field 4 and finally returns into the left half of field 2, where it ends at the terminal 7. In like manner, the inhibit conductor J3, proceeding from the terminal 9, traverses first the left half of field 4, changes over then to the right half of field 2 and finally returns into the left half of field 4, in order to end at the terminal 8. All of the connections are approximately located in the storage plane shown immediately at the border and do not, therefore, have to be led out from the interior in twisted form, whereby the conduction would be interfered with.

Since inhibit conductors start and finish at the border, there is likewise achieved a better conduction pattern; secondly, the interference signals coupled in on the adjacent read conductors from the edge portions 10 are compensated on the same side. This is especially of importance when, as in the example represented, the opposite edge is adjacent to another read conductor. Only one *x*- and one *y*-control conductors *xl, yl* have been shown in the drawing, for reasons of clarity. On the other hand, the current direction as it must occur to control the individual conductors, for example in the writing process, is illustrated at the borders of the storage plane 1 by corresponding arrows. On the basis of this current configuration, a worker in the field would without difficulty be in a position to complete the core pattern, in the case of magnetic core stores. In magnetic core stores, it is further of importance that corresponding point or points at which conductors change over from one column or row to another, occur only in gaps in the storage plane so that at these places there is sufficient space available to be able to guide a needle used for the threading of the wires out of one column and into another.

Here, as also in storage planes operated in thin-layer technique, in which the conductors are oftentimes produced in "printed" circuit technique, the small number of crossing points is also of considerable importance.

The storage plane 1 shown in the drawings, as previously stated, has four fields 2, 3, 4 and 5. A storage plane also may be divided into two fields only (i.e., 2 and 4 of the drawings). Likewise, fields may be added in each direction to a storage plane. In this case the storage plane would be as shown in the drawing, so that each inhibit conductor after leaving a field is staggered laterally by one inhibit conductor strip width and continues in the following field. Such continued guidances of the subdivision, however do not appear to be very logical on account of the intersections occurring in the gaps of the field and of the length of the transverse connections.

Where only one read conductor is located in each storage plane in the magnetic core store, according to the invention, the inhibit conductors can be oriented, without crossing each other, in parallel lamellar extending over the entire storage plane, whose narrow side lies parallel to the direction of the general inhibit conductor. Also in this manner, each inhibit conductor is linked with each control conductor parallel to it within a storage plane only on a portion of its length. In the case of several lamellar read conductors, the operation would be inefficient since a read conductor lamellar and an inhibit conductor lamellar would at least partially overlap along their entire length, and thereby would be linked with one another over many storage cells.

For clarification, however, it should also be considered that in the preferred example of operation of the invention represented in the drawing, that is, with reference to four inhibit conductors and four read conductors connected perpendicular to them and in lamellar form, each read conductor is linked with each inhibit conductor only over the sixteenth part of the storage cells of the storage plane.

The storage planes in accordance with the invention are divisible in a direction perpendicular to the general inhibit conductor direction, that is, although still geometrically unaltered, they can be used for the simultaneous storing of two information units of a word which are independent of one another, as if it were a matter of two separate storage planes. This is advantageous because the same type of storage planes is usable for stores of different storage capacity, as for example, for a 16,384-word store and also for an 8,192-word store; and on the other hand, because square storage planes by their nature require the least circuit expenditure and the least conductor length per storage unit. As a result, in the orientation in the example represented in the drawing, it must be taken into consideration that each inhibit conductor is operable for the one or the other half of the storage plane represented, according to the section in which the selected address occurs.

The drawing and specification present a detailed disclosure of the preferred embodiment of the invention, and it is to be understood that the invention is not limited to the specific form disclosed, but covers all modification, changes and alternative constructions and methods falling within the scope of the principles taught by the invention.

I claim:

1. In a magnetic store of the type which operates according to the coincidence system and having a plurality of individual storage planes, each of which has magnetic storage cells arranged in rows and columns and magnetically coupled with at least one row control conductor and one column control conductor and with one inhibit conductor, and wherein said inhibit conductors are present in each of the storage planes and arranged substantially parallel to an associated control conductor, the improvement to minimize capactive coupling between control and inhibit conductors comprising a plurailty of strips included in each of said storage planes comprising a plurality of control conductors, said strips being subdivided into at least two sections, and each of said inhibit conductors extending first through one first section of a first strip and then through at least one other section of an adjacent strip and finally returned in reverse sequence through the same sections so that the beginning and end of an inhibit conductor is in the same section, at least two inhibit conductors being disposed in each said plane.

2. The improvement according to claim 1, wherein said strips are spaced apart in such a relation that the distance between strips is less than the distance between like ones of said control conductors.

3. The improvement in a magnetic store according to claim 1, wherein the inhibit conductors are oriented so that portions of each of said inhibit conductors conduct parallel to other portions of each of said inhibit conductors in adjacent rows or columns in opposite directions.

4. The improvement in a magnetic store according to claim 1, wherein the inhibit conductors are oriented to cross-over in gaps between adjacent sections of the storage planes.

5. The improvement in a magnetic store according to claim 1, wherein all of the storage cells of each storage plane are magnetically coupled to at least one control conductor for conducting in a direction perpendicular to the direction of the inhibit conductors of the associated plane.

6. The improvement in a magnetic store according to claim 1, wherein the inhibit conductors are located in successively following storage planes and oriented parallel to the rows and alternately to the columns.

7. The improvement in a magnetic store according to claim 5, wherein a plurality of control conductors are located in each storage plane and are coupled to each inhibit conductor over a minimum of storage cells.

8. The improvement in a magnetic store according to claim 4, wherein the control conductors are oriented in lamellar form in a direction parallel to the relatively longer sides of the lamellar of the control conductors.

9. The improvement in a magnetic store according to claim 1, wherein the storage planes consist of a plurality of parts, each of said parts for storing information units independent of one another under like addresses.

10. The improvement in a magnetic store according to claim 1, wherein the control conductors begin and end at the border of the storage planes.

References Cited

UNITED STATES PATENTS

| | | | |
|---|---|---|---|
| 2,911,631 | 11/1959 | Warren | 340—174 |
| 3,208,053 | 9/1965 | Elovic | 340—174 |
| 3,229,264 | 1/1966 | Lee | 340—174 |
| 3,329,940 | 7/1967 | Barnes et al. | 340—174 |

OTHER REFERENCES

Publication I: IBM Technical Disclosure Bulletin "Interlocking Segmentation of Large Memories," by Booth; vol. 1, No. 6, April 1959, pp. 40–41; 340–174 M.

Publication II: IBM Technical Disclosure Bulletin "Crossover Balanced Inhibit Segments," by Councill et al.; vol. 6; No. 4; September 1963; pp. 55–56; 340–174 M.

STANLEY M. URYNOWICZ, Jr., *Primary Examiner.*